Dec. 8, 1959     R. L. GODSHALK     2,916,263
FLUID HEAT EXCHANGE APPARATUS

Filed Dec. 21, 1955     3 Sheets-Sheet 1

INVENTOR.
Russell L. Godshalk
BY
*R. M. Holbrook*
ATTORNEY

Dec. 8, 1959 R. L. GODSHALK 2,916,263
FLUID HEAT EXCHANGE APPARATUS
Filed Dec. 21, 1955 3 Sheets-Sheet 2

*INVENTOR.*
Russell L. Godshalk
BY
ATTORNEY

Dec. 8, 1959 R. L. GODSHALK 2,916,263
FLUID HEAT EXCHANGE APPARATUS
Filed Dec. 21, 1955 3 Sheets-Sheet 3
FIG. 4
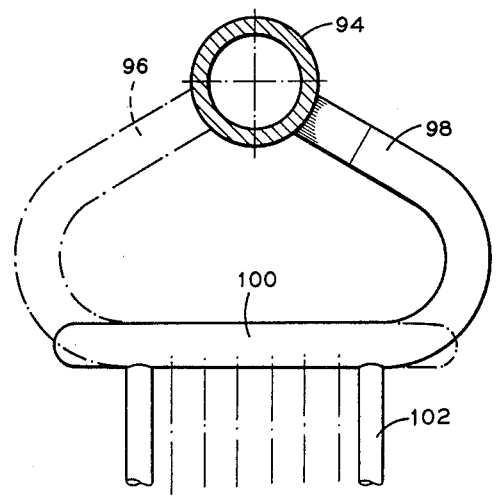
FIG. 5
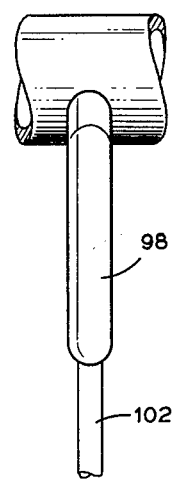
FIG. 6
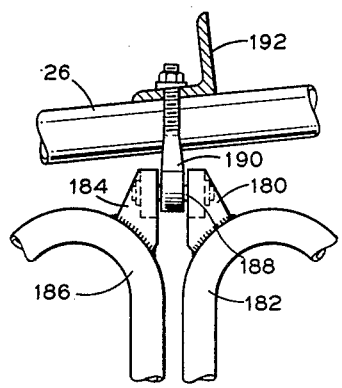
FIG. 8
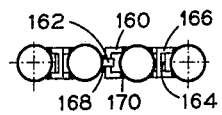
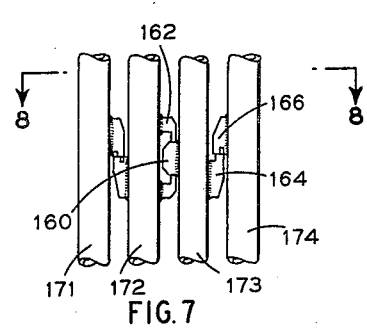
FIG. 7
INVENTOR.
Russell L. Godshalk
BY
ATTORNEY de# United States Patent Office 2,916,263
Patented Dec. 8, 1959

2,916,263

FLUID HEAT EXCHANGE APPARATUS

Russell L. Godshalk, Akron, Ohio, assignor to The Babcock & Wilcox Company, New York, N.Y., a corporation of New Jersey Application December 21, 1955, Serial No. 554,473

10 Claims. (Cl. 257—224)

This invention relates to fluid heat exchange apparatus. The apparatus is exemplified by a high-pressure steam generating and superheating unit of high capacity.

In such high capacity fluid heat exchange units the components thereof are of large size. The tubes of such units must have thick walls to withstand the pertinent high fluid pressure, and this characteristic involves great weights of the tubular components in which a plurality of long tubes are involved. This is true even when the individual tubes are constructed of high strength and expensive steel alloys.

It is also a feature of the pertinent type of steam generating unit that welding together of the tubes and other pressure parts of the components of the unit is involved. This necessitates inspection, such as X-ray inspection, of the separate and multi-farious welds as well as, in many cases, preheating of the segments to be welded, and heat treatment of the welds. Such operations can be carried on most effectively as shop operations where the weld inspection apparatus and the heat treatment equipment may be most effectively maintained and operated. Consequently the present invention involves the shop assembly, fabrication, and welding together of the parts of as many sub-assemblies as possible, and these sub-assemblies are constructed and arranged so as to facilitate the arrangement of the shop assemblies in their ultimately operative relationships, in the field, and also to facilitate the field welding together of the shop assemblies at the site of erection of the unit.

As illustrative of the above indicated method, the present invention involves the shop assembly, fabrication, welding, and heat treatment of series connected tubular sections and associated pressure parts to constitute separate platens of a steam heater such as a superheater or reheater. More specifically, each such shop fabricated platen assembly, by way of example, includes a plurality of series connected tubular sections secured together as a platen structure by inlet and outlet junction headers so as to form a plurality of fluid flow paths in parallel flow arrangement from an inlet junction header as their common inlet to an outlet junction header as their common outlet, with the junction headers arranged with their longitudinal axes parallel to the general plane of the platen assembly.

After the shop fabrication of each platen assembly, a multiplicity of such assemblies are shipped as separate units to the site of erection of the steam generating unit. In the field, and generally at the erection site the shop fabricated platen assemblies are secured together in alignment and in their operative relationships with the junction headers in parallism with, and preferably aligned transversely of, gas flow over the platen assemblies. Then shop fabricated inlet and outlet superheater header assemblies including tubular connections arranged to align with and connect to the junction headers are brought into their operative relationships to effect such alignment and the tubular connections of the inlet and outlet header assemblies are field welded, preferably to the aligned ends of the junction headers. Then this entire steam heater assembly, weighing many tens of tons is hoisted to its elevated operative position and secured to supporting steel work.

Preferably the tubular connections leading from the inlet and outlet headers of the shop fabricated inlet and outlet assemblies diverge downwardly from the inlet and outlet headers and are bowed outwardly to enhance balanced fluid flow conditions and balanced strength or stress conditions relative to the support and operation of the superheater. This arrangement of the tubular connections of the inlet and outlet header assemblies and the junction headers also provides therebetween access space sufficient to permit a welder to work in this space in the field welding and assembly operations.

The invention will be concisely set forth in the claims, but for a more complete understanding of the invention, its uses, and advantages, recourse should be had to the following description which refers to a preferred embodiment of the apparatus shown in the accompanying drawings.

In the drawings:

Fig. 4 is a detail of a modified arrangement of the header connections;

Fig. 5 is a fragmentary end elevation of Fig. 4;

Fig. 6 is a detailed view of the supporting means intermediate the banks of tubes of the Fig. 2 superheater, showing the manner in which the superheater tubes may be supported from the gas pass roof tubes;

Fig. 7 is a fragmentary elevation of the clevis means for holding successive tubular sections of the Fig. 2 superheater in their operative spacing while permitting relative longitudinal movements of the successive tubes resulting from temperature changes;

Fig. 8 is a horizontal section on the line 8—8 of Fig. 7; and

Figure 9:
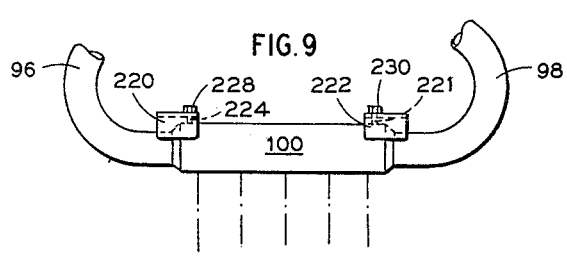

Fig. 9 is a fragmentary view of one of the manifolds 100 with its associated connecting tubes 96 and 98, this view showing devices attached to the ends of the manifold for enhancing the field assembly and erection of the pertinent unit.

Figure 2:
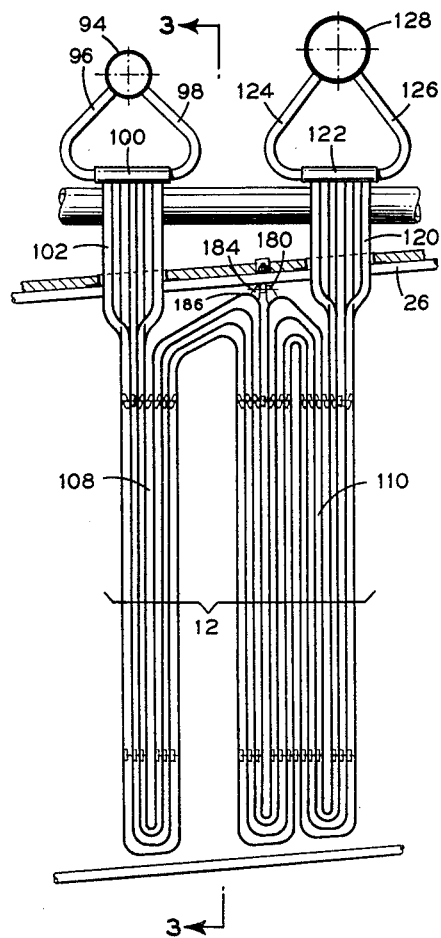
Fig. 2 is a detailed side sectional elevation of a primary superheater similar to the primary superheater involved in the Fig. 1 unit.

In the drawings the primary superheater 10, generally similar to the primary superheater 12 of Fig. 2, is arranged in a horizontal gas pass leading from the combustion chamber of a furnace 14 fired by fuel burners 16 through furnace wall openings provided between steam generating wall tubes leading from the lower header 18, along the furnace floor 20 and then upward along the front wall 22 of the furnace to the furnace roof 24. Thence tubes 26 continue along the furnace roof and along the roof 28 of the horizontal gas pass in which the primary superheater 10 as well as the secondary superheater 30 and the reheater 32 are disposed.

The remaining walls of the furnace include similar upright steam generating tubes, the side wall tubes leading upwardly from lower headers 36 to upper headers 38 which are appropriately connected into the fluid circulation of the steam generating unit by such components as, the downcomer 40, the circulators 42 and 44, and other appropriate circulators leading from the headers 38 to the steam and water drum 46.

Figure 1:
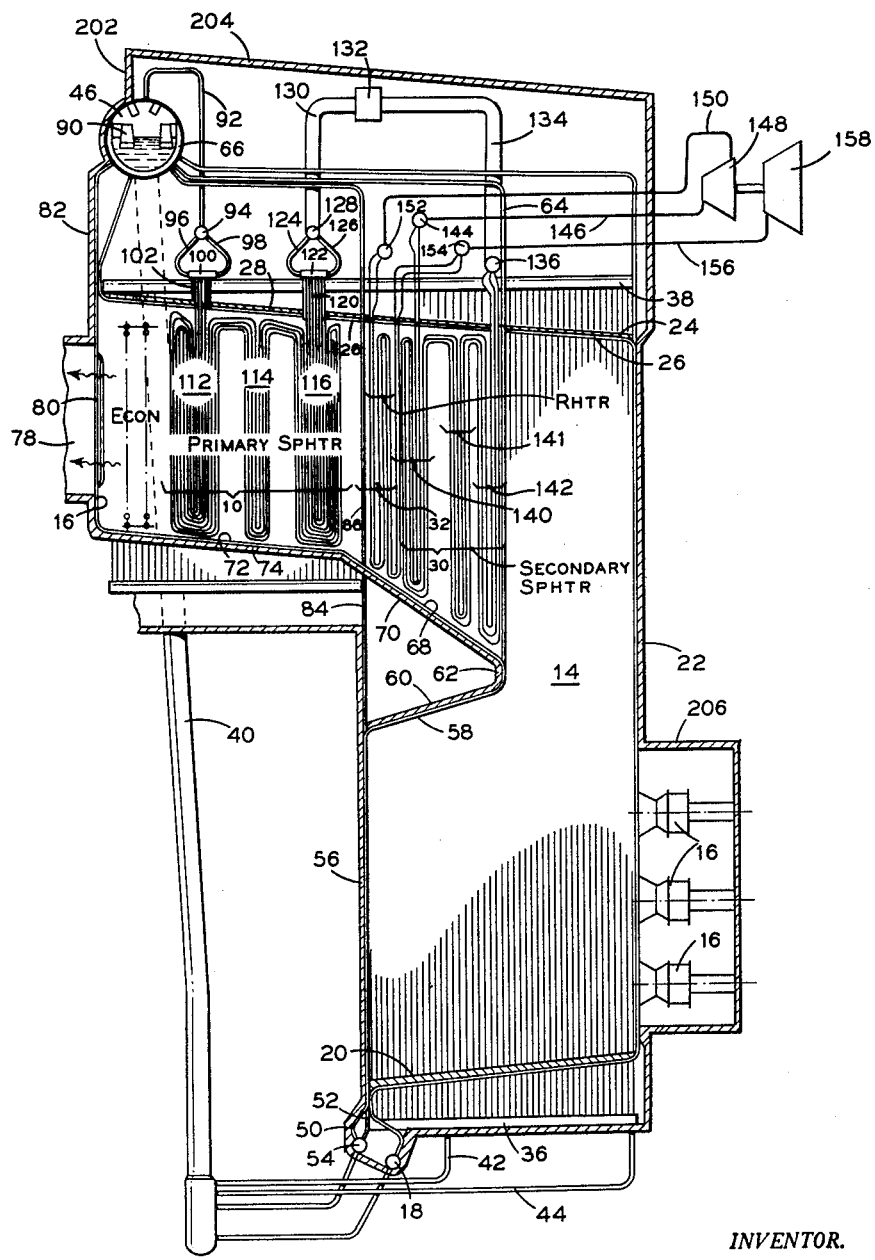
Fig. 1 is a partly diagrammatic sectional elevation of a steam generating and superheating unit constructed in accordance with the invention.

Fig. 1 indicates rows of tubes 50 and 52 leading upwardly from the lower header 54 along the rear wall 56 of the furnace. Some of these tubes have inclined sections 58 leading along the lower arch wall 60. Beyond the nose 62 of the arch some of these tubes are disposed in widely spaced vertical arrangement across the entrance of the superheater and reheater gas pass. They pass through the roof 24 and then continue as circulators 64 leading to the steam and water inlet chamber 66 of the drum 46.

Others of the tubes from the header 54 have upwardly inclined parts 68 leading along the upper wall 70 of the arch. Thence these tubes lead through the sections 72 along the floor 74 of the gas pass. At the gas exit of the gas pass continuing parts of these tubes are disposed vertically as indicated at 76. They extend in widely spaced screen arrangement as indicated at 80 across the passage 78 leading to an air heater. Beyond the screen the tubes continue along the wall 82 to the steam and water mixture inlet chamber 66 of the drum 46.

Others of the tubes 50 and 52 leading from the header 54 continue vertically past the arch as indicated at 84. Thence they continue through the gas pass as indicated at 86, and further continue as circulators leading to the steam and water mixture inlet chamber of the drum 46.

Disposed within the steam and water drum 46 there are rows of steam and water whirl chamber separators 90 such as those indicated by the U.S. patent to Rowand et al., 2,289,970, of July 14, 1942. These separators receive steam and water mixtures which have entered the inlet chamber 66 from the circulators such as 64 and 86. They separate the steam from the water, and the separated steam flows through the superheater supply conduits 92 to the inlet header 94 of the primary superheater. From this inlet header the steam flows through the tubular connections, or "horn" tubes, 96 and 98 which are disposed in rows along the header 94. These tubes conduct steam to the inlet junction headers 100 with the tubes 96 and 98 leading to the opposite ends of all of the junction headers or with alternate tubes 96 and 98 leading to the opposite ends of alternate junction headers 100 (there being one half the number of "horn" tubes, in the latter case). The tubes 96 and 98 are divergent downwardly with their intermediate portions bowed outwardly as clearly indicated in Fig. 1 or Fig. 2 so as to provide space between the inlet header, the tubes 96 and 98 and the junction headers 100, for a welder to operate in welding the lower ends of the tubes 96 and 98 to the ends of the junction headers 100, in the field.

Figure 3:
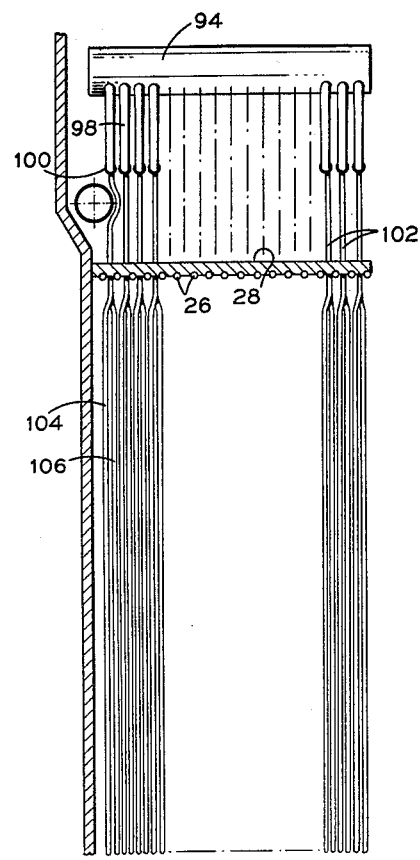
Fig. 3 is a vertical section on the line 3—3 of Fig. 2.

There is a multiplicity of the junction headers 100 across the superheater as clearly indicated in Fig. 3 of the drawing, and connected with and extending downwardly from each junction header 100 there are eight inlet portions 102 of platen tubes. These inlet portions, for each platen, are disposed in a single row in order that they may be effectively disposed between adjacent roof tubes 26, as indicated in Figs. 2 and 3. Below the roof 28, four of these tubes continue in a single row as a part of platen 104, the other four of these tubes continue as the initial part of another, and adjacent platen 106. From these initial platen parts, the tubes continue as return bend tubes, in a single flat platen formation, with successive portions of the platens ultimately constituting the banks of tubes 108 and 110 of Fig. 2, or constituting the banks of tubes 112, 114 and 116 of the Fig. 1 platens. Except for the number of banks of tubes ultimately formed by the platens, the primary superheater of Fig. 1 is considered as a substantial counterpart of the primary superheater of Fig. 2.

The outlet portions 120 of the tubes of each platen 104 and 106 are arranged in a single row so that they may be disposed between successive roof tubes 26, in the same manner as the inlet portions 102 of the platen tubes. Below the level of the roof 28 the tube portions 120 are separate to form two parallel rows of four tube portions each. The platen outlet tube portions 120 in each divided row are connected to the same superheater outlet junction header 122, the junction headers of a plurality of platens being preferably arranged at a single level, in a manner similar to the arrangement of the inlet junction headers 100. From the outlet junction headers 122 the superheated steam flows through the tubular connections or "horn" tubes 124 and 126 which are connected to the junction headers 122 and the superheater outlet header 128 and arranged in the same manner as the arrangement of the tubular connections 96 and 98 with reference to the inlet header 94 and the inlet junction headers 100.

Steam flows from the primary superheater outlet header 128 through one or more conduits 130 to and through, a spray attemperator 132 and then from the attemperator through one or more conduits 134 to the inlet header 136 of the secondary or high temperature superheater 30 consisting of series connected upright tubes connected by return bends and forming the banks of tubes 140—142. From these tubes the superheated steam flows into the secondary superheater outlet header 144 and thence through a line 146 to the inlet of the high pressure turbine stage 148. Steam exhausted from this turbine stage flows through one or more lines 150 to the inlet header 152 of the reheater 32 which consists of serially connected return bend upright tubes horizontally spaced and disposed across the flow of high temperature gases from the furnace 14. From these tubes the reheated steam flows to the reheater outlet header 154 and thence through the line 156 to the inlet of the low pressure turbine stage 158.

Each platen 104 and 106 with its associated junction headers 100 and 122 and other platen tube connectors may be considered as a platen assembly. Each such platen assembly is shop manufactured, assembled, and fabricated, such operations including the butt welding of the tubular return bends to successive platen tube sections, the bending of the tubular sections to the curvatures indicated in the drawing, the preheating of the tubular components to be welded, the examination of the welds, and the heat treatment of the welds.

In the form of the platen assemblies indicated in the drawings, the shop fabrication also includes similar operations with respect to the securement and welding of each pair of inlet and outlet junction headers 100 and 122 to the platen tubes.

When it is considered that each such platen assembly may be of a height in excess of 30 feet and of a width of 20 or more feet, and when it is considered that the weight of each platen assembly, due to the inclusion of its multiplicity of thick walled tubular components may be more than a ton, it will be appreciated that the entire superheater with its inlet and outlet header assemblies including the headers 94 and 128, and with 20 to 40 of the separate platen assemblies may constitute such a cumbersome and bulky component of the entire steam generating unit that it cannot be shipped as a unit to the site of erection of the unit.

Each platen unit is of such size that it can be readily shipped and handled during transportation from the shop to the erection site and therefore the separate platen units are wholly shop fabricated and shipped as separate units to the erection site.

The above indicated shop fabrication of each platen unit includes the means for holding the adjacent superheater tube sections in operative alignment, such means including the intertube clevis components such as those indicated at 160, 164 and 162, 166 in Figs. 7 and 8. These clevis connector components are welded to the tubes as indicated at 168 and 170 and are arranged so as to maintain the successive superheater tube sections such as 171—174 in their operative spacing while permitting slight relative movements between successive tubular sections due to temperature differences.

Each shop fabricated superheater platen assembly may also include the tube securing and supporting means indicated in Fig. 6 and also in Fig. 2. This means, includes for each platen, a plate or plates 180 welded to a return bend 182, and a similar plate construction 184 welded to a return bend 186. These plate constructions may be U-shaped in plan with a pintle or rod 188 extending through the mid-portions of each plate construction so as to connect them and afford support for the eyebolt or hanger 190 through which the platens and the entire superheater assembly may be secured to the roof tubes 26 through the intermediary of the steel-work component 192, indicated in Fig. 6.

After the shop fabricated platen assemblies are received at the erection site, these assemblies are arranged in such uniform and closely spaced operative relationships as indicated in Fig. 3 of the drawings. This action may include a fastening of temporary platen supporting means which may be removed after the shop fabricated inlet and outlet superheater header assemblies with their tubular connectors 96, 98, 124, 126 are arranged in their operative relationships to the platen assemblies indicated in Figs. 2 and 3 and after these tubular connectors are field welded to the junction headers 100 and 122 by the welder who may have access to these weld zones through the spaces between the opposite rows of connectors and the junction headers and the inlet and outlet headers.

Such field operations advantageously involve such a temporary platen supporting and aligning means as indicated in Fig. 9. This means includes half pipe sections 220 and 222 secured at the ends of each junction header or manifold 100 by cap screws 224 and 221 welded to the ends of the manifold and held thereon by the tightening of the nuts 228 and 230 on the cap screws. These half pipe sections 220 and 222 may be utilized to align each junction manifold with the ends of the connecting tubes 96 and 98 to which the ends of the manifold are to be welded. These half pipe fixtures also enhance and facilitate the field assembly of the unit. This may be illustrated by considering that each superheater header assembly including such a header as that shown at 94 with its connecting tubes 96 and 98 is held in an elevated position and the successive platen assemblies with their fixtures 220 and 222 are elevated to such a position that the lowermost parts of the fixtures are above the lower ends of the connecting tubes 96 and 98. The platen assembly then may be moved laterally so that the projecting ends of the half pipes fixtures rest upon the aligned lower ends of the connecting pipes 96 and 98, thereby aligning those components and holding them in their operative or near-operative relationship until the field welding takes place, joining both ends of each junction manifold 100 to the juxtaposed ends of the associated tubes 96 and 98. Thereupon the inlet and outlet headers may be rigidly but temporarily connected by heavy struts and the entire superheater unit, weighing many tens of tons may be elevated to its operative position which may be 100 feet or more above the ground level, its operative position being somewhat indicated in Fig. 1 of the drawing.

After the entire superheater unit is moved to its operative position, it is permanently secured to appropriate steel work, and thereafter connected to other components of the steam generating unit, as previously indicated.

With further reference to the arrangement of the shop fabricated inlet and outlet header assemblies including, on the one hand, the inlet header 94 and its tubular connections 96 and 98, and, on the other hand, the outlet header 126 and its rows of tubular connectors 124 and 126, it is to be appreciated that under some circumstances each junction header 100 may have a tubular connector 98 secured thereto at one end and a tubular connector 96 secured at its other end, and with other conditions, it is within the scope of the invention that each junction header such as the header 100 may have only one connector (96 or 98) connected thereto. In this event, it is preferable that alternate junction headers such as 100 have the associated connectors (96 or 98) secured to alternately opposite ends. To make this clear the first junction header 100 may have a tubular connector 98 secured thereto at its right-hand end and have no connector secured to its left-hand end while the next or successive junction header 100 has a tubular connector 96 secured thereto at its left-hand end and no such connector secured thereto at its right-hand end.

Referring further to Fig. 1 of the drawings, it is to be understood that the pressure parts of heat absorbing parts of the unit are enclosed within thermal insulating components such as the walls 200 and 202 and the roof 204. Similarly, the remaining walls of the unit involve thermal insulating material which will also enclose the windbox 206 through which heated combustion superheating air is supplied to the burners 16.

Although the invention has been described with reference to the details of the preferred embodiment shown in the drawings, it is to be appreciated that the invention is not to be considered as limited to all of such details. The invention is rather to be taken as of a scope commensurate with the scope of the sub-joined claims.

What is claimed is:

1. In convection heat exchange apparatus; a plurality of horizontally spaced platen units each comprising tubular means constituting a plurality of tube sections arranged in alignment as a flat platen and forming a plurality of fluid flow paths in parallel leading from a common inlet to a common outlet, a junction header extending generally in the plane of the platen and having the inlets of the flow paths of said tubular sections connected therewith, and another junction header similarly arranged with its longitudinal axis parallel to the plane of the platen and having the outlets of the parallel flow paths of the tubular sections communicating therewith, the longitudinal axes of the junction headers being coaxial; means forming a gas passage; the platen tubes depending from the junction headers and disposed transversely of the flow of high temperature gases in said passage; a main inlet header disposed directly above and substantially spaced from the inlet junction headers with its long axis transverse to the axes of said inlet junction headers; a main outlet header similarly disposed above the outlet junction headers; and oppositely bowed tubular elements connecting the ends of said junction headers with their associated main headers.

2. In convection fluid heat exchange apparatus, means forming a gas passage for the flow of high temperature heating gases, said means including spaced apart parallel roof tubes, a convection heat exchange unit in the form of a bank of upright and horizontally spaced tubes disposed across gas flow in said gas pass, means maintaining the upright tubes of said unit in a plurality of groups with each group forming an upright flat platen with its plane generally parallel to the gas flow in the gas pass, the tubular sections for each platen providing for parallel fluid flow through a plurality of flow paths leading from a common inlet to a common outlet for each platen provided by an inlet junction header and an outlet junction header arranged with their longitudinal axes extending in the general plane of the platen, the inlet and outlet portions of the platen tubes being disposed in a row generally parallel to the plane of the platen and arranged between successive roof tubes with their connected junction headers disposed above the roof tubes, the platens and the junction headers being held together as a unit involving a multiplicity of platens across the gas pass, the inlet junction headers for successive platens being disposed generally at the same level and the outlet junction headers being disposed generally at the same level, an inlet header for said unit being disposed directly above and with its longitudinal axis extending transversely of the inlet junction headers, tubular connections between the inlet header and the inlet junction headers, said tubular connections leading from the alternately opposite ends of successive junction headers and being constructed to provide access space between the junction headers and the inlet header, an outlet header similarly arranged with respect to the outlet junction headers, and similarly arranged tubular connections between the outlet header and the outlet junction header.

3. In convection fluid heat exchange apparatus, means forming a gas passage for the flow of high temperature heating gases, said means including spaced apart parallel roof tubes, a convection heat exchange unit in the form of a bank of upright and horizontally spaced tubes disposed across gas flow in said gas pass, means maintaining the upright tubes of said unit in a plurality of groups with each group forming an upright flat platen with its plane generally parallel to the gas flow in the gas pass, the tubular sections for each platen providing for parallel fluid flow through a plurality of flow paths leading from a common inlet to a common outlet for each platen being provided by an inlet junction header and an outlet junction header arranged with their longitudinal axes parallel to the general plane of the platen, the inlet and outlet portions of the platen tubes being disposed in a single row generally parallel to the plane of the platen and arranged between successive roof tubes with their connected junction headers disposed above the roof tubes, the platens and the junction headers being held together as a unit involving a multiplicity of platens across the gas pass, the inlet junction headers for successive platens being disposed generally at the same level and the outlet junction headers being disposed generally at the same level, an inlet header for said unit being disposed directly above and with its longitudinal axis extending transversely of and substantially spaced from the inlet junction headers, tubular connections between the inlet header and the inlet junction headers, said tubular connections leading from opposite ends of alternate junction headers and being outwardly bowed to provide access space between the junction headers and the inlet header, an outlet header similarly arranged with respect to the outlet junction headers, and similarly arranged tubular connections between the outlet header and the outlet junction header.

4. In convection fluid heat exchange apparatus means forming a gas passage for the flow of high temperature heating gases, convection heat exchange unit in the form of a bank of upright and horizontally spaced tubes disposed across gas flow of said gas pass, means maintaining the upright tube of said unit in a plurality of groups with each group forming an upright flat platen with its plane generally parallel to the gas flow in the gas pass, the tubular sections for each platen providing for parallel fluid flow through a plurality of flow paths leading from a common inlet to a common outlet for each platen provided by an inlet junction header and an outlet junction header arranged with their longitudinal axes extending in the general plane of the platen, the inlet and outlet portions of the platen tubes being disposed in a single row generally in the plane of the platen and arranged with their connected junction headers superposed, the platens and the junction headers being held together as a unit involving a multiplicity of platens across the gas pass, the inlet junction headers for successive platens being disposed generally at the same level and the outlet junction headers being disposed generally at the same level, an inlet header for said unit being disposed directly above and with its longitudinal axis extending transversely of the inlet junction headers, two rows of tubular connections between the inlet header and the inlet junction headers, said tubular connections leading from opposite ends of alternate junction headers and being outwardly bowed to provide access space between the junction headers and the inlet header, an outlet header similarly arranged with respect to the outlet junction headers, and similarly arranged tubular connections between the outlet header and the outlet junction header.

5. In convection heat exchange apparatus; a plurality of platen units each comprising tubular means constituting a plurality of series connected tube sections arranged in alignment as a flat platen and forming a plurality of fluid flow paths leading in parallel from a common inlet to a common outlet, a junction header with its long axis parallel to the plane of the platen and having the inlets of the flow paths of said tubular sections connected therewith, and another junction header similarly arranged with its longitudinal axis parallel to the plane of the platen and having the outlets of the parallel flow paths of the tubular sections communicating therewith, the longitudinal axes of the junction headers being co-axial; means forming a gas passage; the platen tubes depending from the junction headers and disposed transversely of the flow of high temperature gases in said passage; a main inlet header disposed directly above the inlet junction headers with its long axis transverse to the long axes of the inlet junction headers; a main outlet header similarly disposed above the outlet junction headers; and tubular elements each connecting a junction header with its associated main header; each of said last mentioned tubular elements having its intermediate portion bowed outwardly away from the adjacent end of its associated junction header end and having its lower end extending toward and aligned with said junction header end portion to facilitate field welding of the tubular element to its associated junction header.

6. A pendent type heat transfer unit comprising a series of vertically arranged side-by-side flat tube platens, each having a row of transversely aligned fluid heating tubes forming a plurality of parallel fluid flow paths, a row of junction headers each having its longitudinal axis substantially in the plane of a corresponding tube platen and connected to one end of the tubes thereof, a common main header symmetrically arranged relative to and directly above said row of junction headers with its longitudinal axis extending transversely thereof, and means for pendently supporting said tube platens from said common header comprising rows of oppositely and outwardly bowed tubes each having its upper end connected to said main header and its lower end aligned with and connected to the adjacent end of a corresponding junction header to define an access space between said main header, bowed tubes and said row of junction headers.

7. A pendent type heat transfer unit comprising a series of vertically arranged side-by-side flat tube platens, each having a row of transversely aligned fluid heating tubes forming a plurality of parallel fluid flow paths, a row of junction headers each having its longitudinal axis substantially in the plane of a corresponding tube platen and connected to one end of the tubes thereof, a common main header symmetrically arranged relative to and directly above said row of junction headers with its longitudinal axis extending transversely thereof, and means for pendently supporting said tube platens from said common header comprising pairs of oppositely and outwardly bowed tubes each pair having their upper ends connected to said main header and their lower ends connected to the adjacent end portions of a corresponding junction header to define an access space between said main header, bowed tubes and said row of junction headers.

8. A pendent type heat transfer unit comprising a series of vertically arranged side-by-side flat tube platens, each having a row of transversely aligned nested looped fluid heating tubes forming a plurality of parallel fluid flow paths, a row of junction headers each having its longitudinal axis substantially in the plane of a corresponding tube platen and connected to one end of the tubes thereof, a common main header symmetrically arranged relative to and directly above said row of junction headers with its longitudinal axis extending transversely thereof, and means for pendently supporting said tube platens from said common header comprising pairs of oppositely and outwardly bowed tubes each pair having their upper ends connected to said main header and their lower ends aligned with and connected to the corresponding adjacent end of a corresponding junction header to define an access space between said main header, bowed tubes and said row of junction headers.

9. A pendent type heat transfer unit comprising transversely spaced series of vertically arranged flat tube platens, each platen having a row of transversely aligned nested looped fluid heating tubes forming a plurality of parallel fluid flow paths, transversely spaced rows of inlet and outlet junction headers each having its longitudinal axis substantially in the plane of a corresponding tube platen and connected to one end of the tubes thereof, a common main header symmetrically arranged relative to and directly above each row of junction headers with its longitudinal axis extending transversely thereof, and means for pendently supporting said transversely spaced series of tube platens comprising pairs of oppositely and outwardly bowed tubes each pair having their upper ends connected to said main header and their lower ends connected to the adjacent end portions of a corresponding junction header to define an access space between said main header, bowed tubes and said row of junction headers, and means for connecting and pendently supporting transversely adjacent looped portions of said tubes at an elevation below said junction headers.

10. A pendent type heat transfer unit comprising a series of vertically arranged side-by-side flat tube platens, each having a row of transversely aligned fluid heating tubes forming a plurality of parallel fluid flow paths, a row of junction headers each having its longitudinal axis intermediate the planes of a pair of adjacent tube platens and connected to a bent end of all of the tubes of said adjacent tube platens, a common main header symmetrically arranged relative to and directly above said row of junction headers with its longitudinal axis extending transversely thereof, and means for pendently supporting said tube platens from said common header comprising pairs of oppositely and outwardly bowed tubes each pair having their upper ends connected to said main header and their lower ends aligned with and connected to the adjacent ends of a corresponding junction header to define an access space between said main header, bowed tubes and said row of junction headers.

References Cited in the file of this patent

UNITED STATES PATENTS

| | | |
|---|---|---|
| 1,887,854 | Lasker | Nov. 15, 1932 |
| 2,288,297 | Naiman | June 30, 1942 |
| 2,304,976 | Watter | Dec. 15, 1942 |
| 2,500,771 | Pyle | Mar. 14, 1950 |
| 2,600,895 | Marshall | June 17, 1952 |
| 2,685,279 | Caricristi | Aug. 3, 1954 |
| 2,688,466 | Baver | Sept. 7, 1954 |
| 2,715,019 | Walter | Aug. 9, 1955 |
| 2,722,735 | Beamish | Nov. 8, 1955 |
| 2,764,476 | Etter | Sept. 25, 1956 |